United States Patent
Joseph et al.

(10) Patent No.: US 9,665,158 B2
(45) Date of Patent: May 30, 2017

(54) BATTERY SAVE MODE

(71) Applicant: Verizon Patent and Licensing Inc., Arlington, VA (US)

(72) Inventors: Peter Joseph, Kerala (IN); Guruharan Ravi, Chennai (IN); Santosh C. Abraham, Chennai (IN); Sudharsanan Swaminathan, Madurai (IN); Rajarathinam Maduram, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 143 days.

(21) Appl. No.: 14/630,882

(22) Filed: Feb. 25, 2015

(65) Prior Publication Data

US 2016/0246351 A1 Aug. 25, 2016

(51) Int. Cl.
*G06F 1/32* (2006.01)

(52) U.S. Cl.
CPC .......... *G06F 1/3212* (2013.01); *G06F 1/3265* (2013.01)

(58) Field of Classification Search
CPC .............................. G06F 1/3212; G06F 1/3228
USPC ........................................................ 713/300
See application file for complete search history.

(56) References Cited

U.S. PATENT DOCUMENTS

| | | | |
|---|---|---|---|
| 2009/0098914 A1* | 4/2009 | Martin-Cocher | H04W 52/0261 455/572 |
| 2010/0048253 A1* | 2/2010 | Park | G06F 1/1613 455/566 |
| 2011/0072378 A1* | 3/2011 | Nurminen | G06F 1/32 715/771 |
| 2012/0200587 A1* | 8/2012 | Bapst | G09G 3/3208 345/589 |
| 2012/0322387 A1* | 12/2012 | Nicoara | H04M 1/24 455/67.11 |
| 2013/0090101 A1* | 4/2013 | Park | G06F 3/147 455/414.3 |
| 2014/0258747 A1* | 9/2014 | Narayan | G06F 1/3287 713/320 |
| 2014/0365794 A1* | 12/2014 | Decker | G06F 1/3246 713/320 |
| 2015/0198996 A1* | 7/2015 | Kliegman | G06F 1/3212 713/324 |

* cited by examiner

*Primary Examiner* — Vincent Tran

(57) ABSTRACT

A battery-powered device may receive document data that includes information associated with a document. The device may determine a battery level and may determine whether the battery level satisfies a threshold value. If the battery level satisfies the threshold value, the device may present the document for display. If the battery level does not satisfy the threshold value, the device may present a battery-saving version of the document for display. The battery-saving version may omit and/or modify one or more elements included in the document.

20 Claims, 7 Drawing Sheets

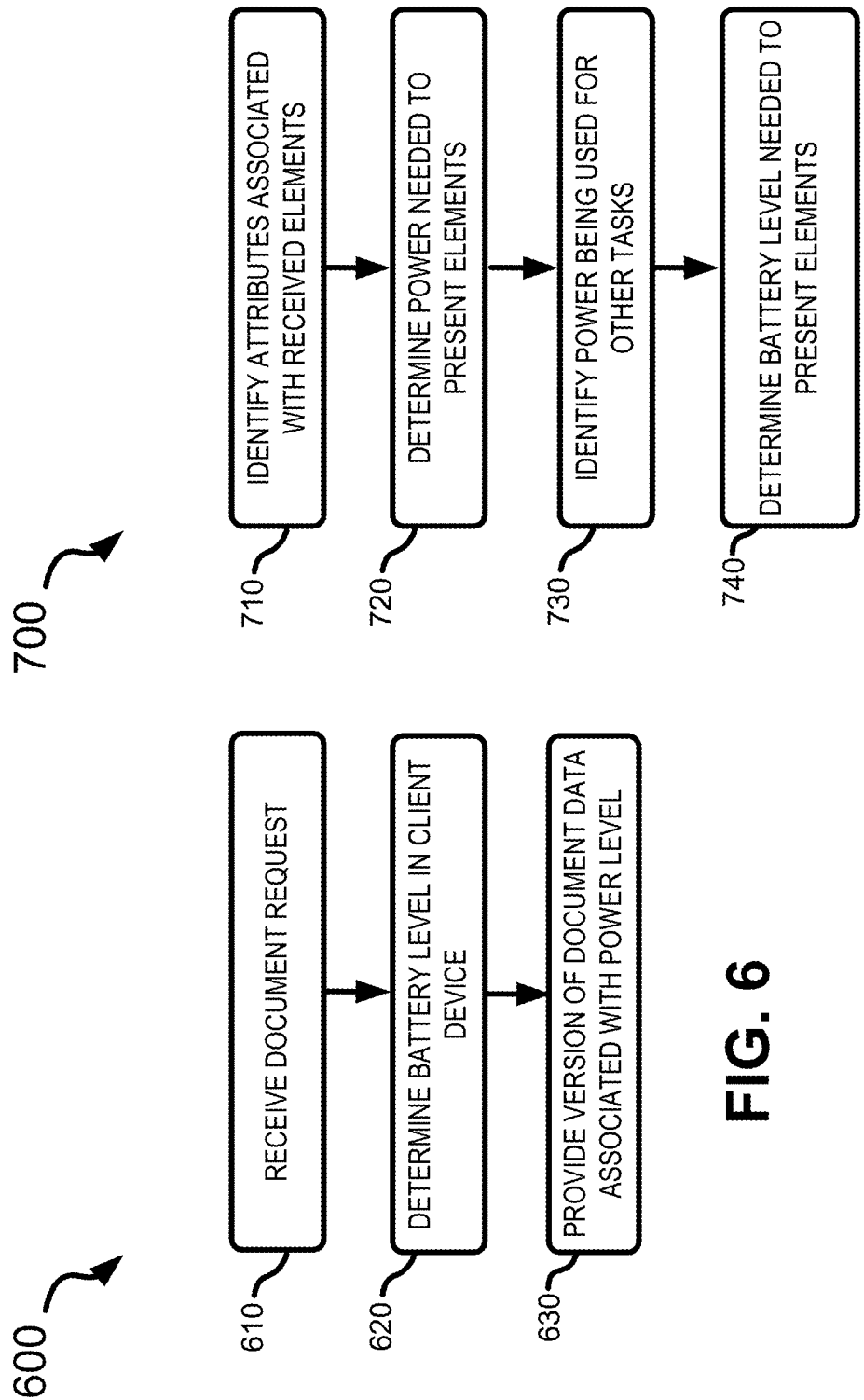

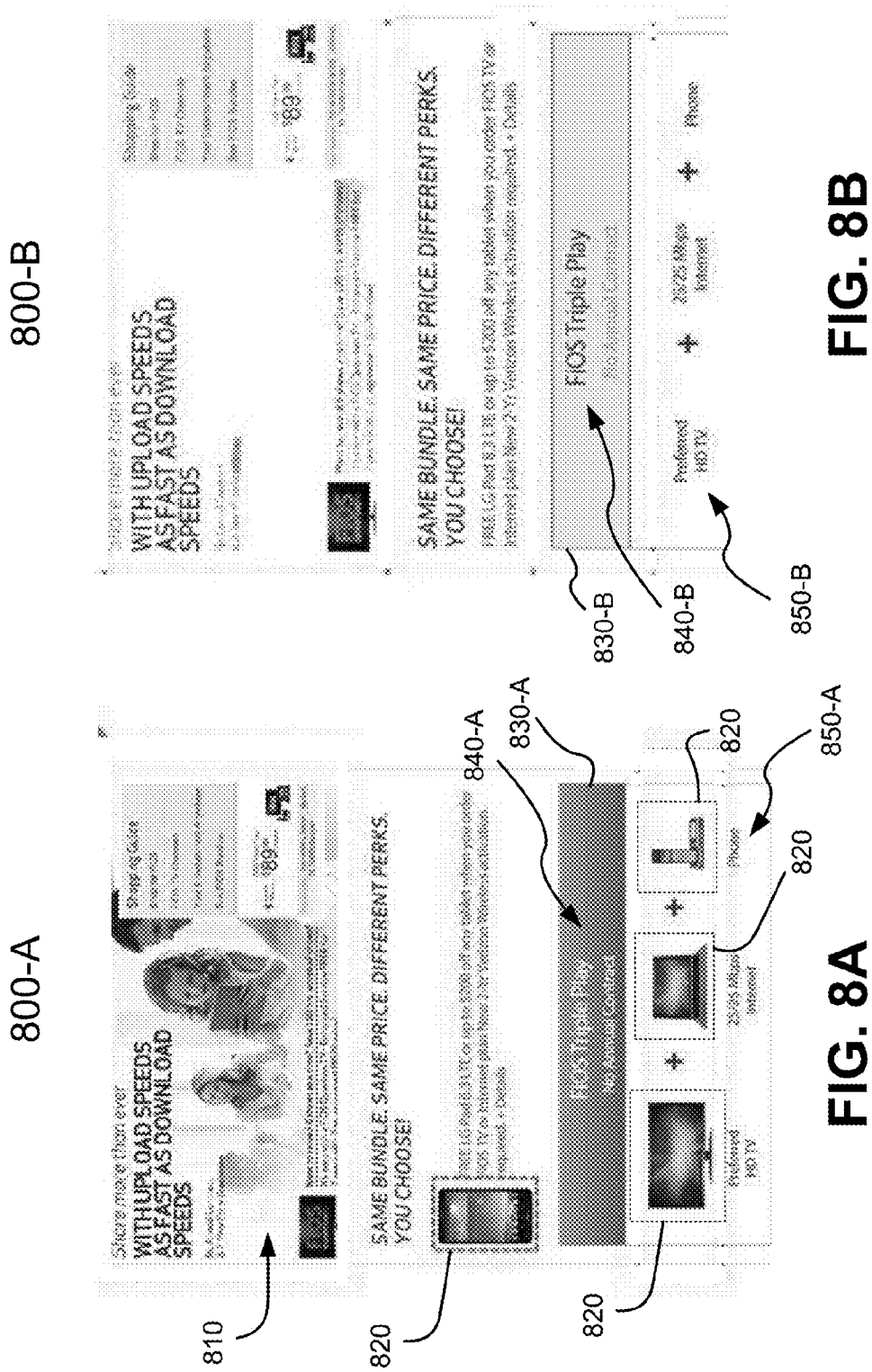

BATTERY SAVE MODE

BACKGROUND INFORMATION

A document, such as a web page or an application screen, may be accessed by a client device via a network, such as the Internet, and a browser or other application on the client device may display the document and associated contents. For example, a document may include data identifying particular contents and format of the contents. For example, a document may includes information identifying the colors of associated text and backgrounds to be output and may further contain links to images and/or other types of media content (e.g., audio and/or video files) to be included in a presented version of the document. The application may obtain the images and may render the images along with the text and other material in single display. The contents and the format of a web page may be encoded using hypertext markup language (HTML) to include links that allow a user to access other documents. The layout, typographic, and color-scheme information may be provided by cascading style sheet (CSS) instructions, which may be embedded in the HTML or may be provided by a separate file that is referenced from within the HTML. The document may further include active (or dynamic) content. For example, a document may include computer code or script, such as extended markup language (XML), JavaScript, or code implementing asynchronous JavaScript and XML (AJAX) techniques, and the scripts may executed on the application when presenting the document.

BRIEF DESCRIPTION OF THE DRAWINGS

FIGS. 5-7 are flowcharts of exemplary processes for selectively presenting a standard display or a low battery display based on a battery level associated with a client device included in the environment of FIG. 1; and FIGS. 8A and 8B show an exemplary original display and an exemplary modified display that may be presented according to implementations described herein.

DETAILED DESCRIPTION OF PREFERRED EMBODIMENTS

The following detailed description refers to the accompanying drawings. The same reference numbers in different drawings identify the same or similar elements.

In systems and methods described herein, a battery-powered device may receive document data that includes information associated with a document. The device may determine its battery level and determine whether the battery level satisfies a threshold value. If the battery level satisfies the threshold value, the device may present the document for display. If the battery level does not satisfy the threshold value, the device may present a battery-saving version of the document for display. The battery-saving version may omit and/or modify one or more elements included in the document.

Figure 1:
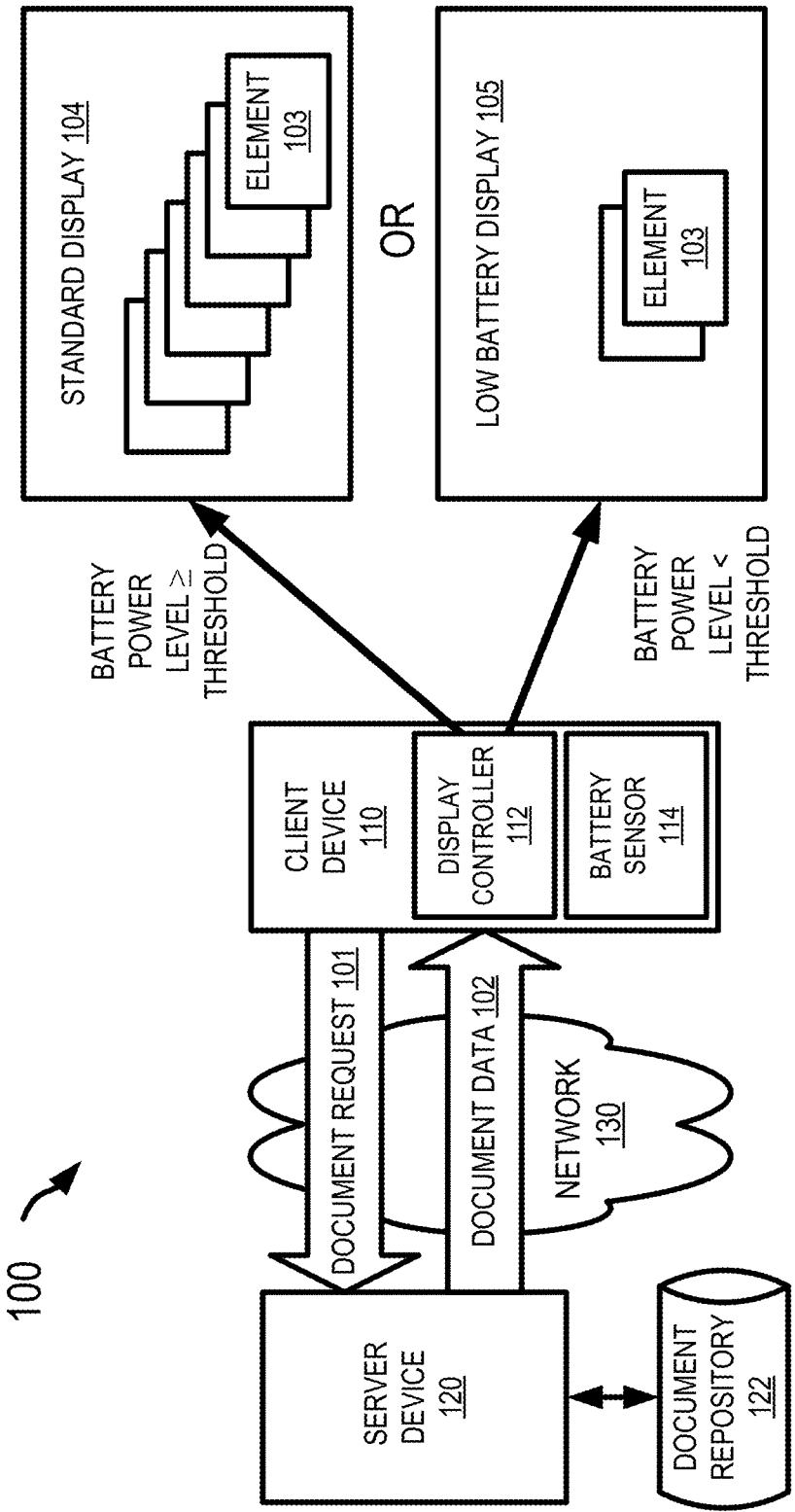
FIG. 1 is a diagram illustrating an exemplary environment according to implementations described herein.

FIG. 1 is a diagram showing an exemplary environment 100 in which the systems and/or methods, described herein, may be implemented. As shown in FIG. 1, environment 100 may include a client device 110 (that may include a display controller 112 and a battery sensor 114), a server device 120 coupled to a document repository 122, and a network 130. In one implementation, server device 120 may receive (e.g., from client device 110 or another device) document request 101 and may access document repository 122 to obtain and forward, as document data 102, information identifying elements 103 included in the requested document. Battery sensor 114 may determine a battery level (e.g., an amount of power and/or a percentage of stored remaining power) associated with client device 110. When the battery level satisfies a threshold amount (such as at least 20% or some other percentage of its capacity/full charge), display controller 112 may present a standard display 104 that includes multiple elements 103, whereas display controller 112 may generate and/or present a low battery display 105 that includes a subset of elements 103 and/or modified versions of elements 103 when the battery level does not satisfy the threshold amount.

As used herein, client device 110 may include any battery-powered device that is capable of communicating via network 130 to receive document data 102 associated with elements 103 and presenting one of standard display 104 or low battery display 105 based on a battery power level associated with client device 110. For example, client device 110 may include a portable communication device (e.g., a mobile phone, a smart phone, a phablet device, a global positioning system (GPS) device, and/or another type of wireless device); a laptop (e.g., with a wireless air card), tablet, or another type of portable computer; a media playing device; a portable gaming system; a wearable device (e.g., a smart watch, a smart glasses, a fitness tracker, etc.) and/or any other type of mobile computer device with communication and output capabilities. In some implementations, client device 110 may also include an application, such as a browser or a multimedia player, to allow a document to be presented on an associated display. As used herein, a "document" may refer to an alphanumeric text string, a web page, a website including multiple web pages, an advertisement, an e-mail or other message, a multimedia stream, script or code, a file, etc.

Document data 102 may be sent to client device 110 based on server device 120 receiving document request 101. Document request 101 may be manually entered by a user associated with client device 110 or may be sent in response to a user input. For example, client device 110 may forward document request 101 in response to receiving a user selection of a hyperlink or otherwise activating code within a document or application. In another example, client device 110 may automatically generate document request 101 based on an occurrence of a triggering event, such as activation of client device 110, detection of an error, etc. Although FIG. 1 illustrates document request 101 as originating from client device 110, it should be appreciated that document request 101 may be generated and/or sent from another device (not shown), such as another client device, an application server, etc., or may be generated by server device 120. For example, document request 101 may be generated by server device 120 to push document content, such as service agreement, instructions, an update, etc., to client device 110.

In one implementation, document request 101 may correspond to a uniform resource locator (URL), a storage address, etc., associated with a requested document. Document request 101 may include an indication regarding a battery level associated with client device 110. For example, if document request 101 corresponds to a URL, document request may include an extension or other data identifying the battery level. Additionally or alternatively, document request 101 may specifically request a standard version of the document (e.g., identifying elements 103 rendered in standard display 104) or a low battery version of the document (e.g., identifying elements 103 rendered in low battery display 105). For example, client device 110 may forward document request 101 (e.g., a first URL) associated with the standard version of the document when the battery power is above a threshold level and a different document request 101 (a second URL) associated with the low battery version of the document when the battery power is below the threshold level. Display controller 112 may then display elements 103 included in the received document data 102 to present one of standard display 104 or low battery display 105.

Document data 102 may include information related to elements 103 that relate to content of a document (e.g., text, graphics, images, video, audio, and any other content that may be included in the document), attributes of document content, tags associated with document content, anchors to content not included in the document (e.g., hyperlinks to other documents, media content, etc.), embedded media players (e.g., a Flash player), script objects (e.g., Javascript objects), and/or any other components that may be included in a document. If a document includes HTML or other type of code, documents data 102 may include information related to structural markup elements that indicate layout structure and/or purpose of web page content, presentational markup elements that indicate appearance of web page content, cascading style sheets ("CSS") that indicate styles and/or other presentation attributes for web page content, content elements that include web content, and anchor elements that form hyperlinks to other content not included in the web page. An exemplary element 103 of a document represented by HTML code may include a pair of tags (e.g., a start tag and an end tag) with web page content, attributes, and/or other elements disposed between the pair of tags. Document data 102 may further include Extensible Markup Language ("XML"), Extensible Hypertext Markup Language ("XHTML"), etc.), Lua, Enhanced Binary Interchange Format ("EBIF"), one or more script objects, and/or other form of computing code configured to be processed by client device 110 (e.g., by a web browser application running on a client device 110) to generate one of standard display 104 or low battery display 105.

In another implementation, display controller 112 may selectively display elements 103 in a requested document based on battery level determined by battery sensor 114. For example, display controller 112 may provide standard display 104 when battery power levels are above a threshold level by presenting multiple elements 103 included in document data 102, and display controller 112 may provide low battery display 105 when battery power levels are below the threshold level by selectively presenting only a subset of elements 103 included in document data 102 and/or modifying one or more of the elements. In one implementation, document data 102 received from server device 120 may include control information identifying which of elements 103 to exclude/include from low battery display 105. Alternatively, display controller 112 may identify which elements 103 to include and/or modify for output via low battery display 105

For example, document data 102 may specify that certain interactive elements of a document (e.g., elements such as hyperlinks, navigation buttons, etc. that may be selected by a user) should be selected by display controller 112 for inclusion in low battery display 105 so that functionality associated with the original document may be maintained. Examples of subtypes of interactive elements include, for example, navigational elements (e.g., elements that may be selected by a user to access other web pages such as other web pages associated with the same website), media content link elements (e.g., elements that may be selected by a user to access media content linked to the elements), embedded media player elements, and any other types of interactive elements of a web page. In some examples, document data 102 may more specifically specify subtypes of navigational elements to be selected for inclusion in low battery display 105. Examples of such subtypes include primary navigational elements (e.g., persistent navigational buttons of a website that provide links between primary web pages of the website) and other non-primary navigational elements (e.g., text hyperlinks to other web pages).

Additionally or alternatively, display controller 112 may evaluate document data 102 to dynamically select one or more elements 103 to exclude/include within low battery display 105. For example, display controller 112 may parse document data 102 to identify elements 103, and may selectively display elements 103 based on a battery level determined by battery sensor 114. For example, display controller 112 may select a certain quantity of elements 103 (e.g., a first quantity of elements 103 identified in document data 103 or appearing closest to the top of standard display 104) or may select a certain quantity of elements 103 on a random or a round robin fashion. In another example, display controller 112 may identify elements 103 that are inconspicuous (e.g., background items) and/or that would require the most battery power (e.g., elements 103 that would require the most processing and/or certain elements 103 that are brightest, largest, most colorful, etc., within standard display 104 and would, therefore, require more power to display) and may exclude the identified elements 103 from low battery display 105. In yet another example, display controller 112 may include logic that identifies certain attributes of visual elements to include in low battery display 105, and display controller 112 may selectively display elements 103 that include these attributes.

In certain implementations, display controller 112 may modify an attribute of an element 103 included in low battery display 105. For example, display controller 112 may modify a color, a brightness, size, resolution, contrast, volume, location, text size, or other attribute associated with element 103. If element 103 is active (e.g., is dynamically generated and/or obtained), display controller 112 may modify processing related to the active element 103. For example, display controller 112 may limit a bandwidth, processing time, memory use, storage space, etc., associated with an active element 103. For example, if element 103 is associated with dynamic content, then low battery display 105 may include a static version of the dynamic content. Additionally or alternatively, display controller 112 may modify code/script associated with an active element 103. For example, display controller 112 may modify the code so that a cached, previously obtained version of data is used for an active element 103 in low battery display 105 instead of obtaining/generating new data.

Additionally or alternatively, display controller 112 may apply logic or heuristics identifying a presentation scheme, style, structure, etc., for low battery display 105. For example, display controller 112 may include a sufficient number of elements 103 in low battery display 105 so that a resulting display has a threshold length, width, amount of content, layout, etc. In another example, display controller 112 may include particular quantity of original elements 103 (e.g., a certain quality of colored elements 103 from standard display 104) so that a user may visually verify that client device 110 is operating correctly and that low battery display 105 is a modified version of standard display 104.

To generate low battery display 105, display controller 112 may use element tags, element attributes, element identifiers, style sheets, and/or any other information included in document data 102 to determine and select the type or types of elements 103 that match the conditions specified in the heuristic. For example, display controller 112 may identify layout, typographic, and color-scheme information, for standard display 104, that are included in a cascading style sheet (CSS), and may modify the CSS to form the low battery display 105. For example, display controller 112 may modify a color variable associated with certain elements 103 so that the elements 103 are presented in grayscale. In another example, display controller 112 may follow links included in document data 102 to determine the type or types of the link elements based on the content to which the link elements are directed. For example, display controller 112 may follow a link to determine whether the linked content includes media content, another web page, or other content, and based on this determination, display controller 112 may categorize the linked content as being a particular type of element 103 to include/exclude from low battery display 105.

Battery sensor 114 may determine a current battery level (e.g., an amount of remaining power and/or a percentage of a full battery charge) that is present in the battery when document data 102 is received. For example, battery sensor 114 may include a voltage and/or current meter to evaluate a status and/or an output of a battery to determine a remaining battery level based on the sensor data. In another example, battery sensor 114 may include a processor that executes a script to determine a remaining battery level. For example, script included in document data 102 may cause battery sensor 114 to access certain battery-related operation values associated with client device 110. For example, battery sensor 114 may access a BATTERY_PROPERTY_CAPACITY variable maintained by client device 110 to identify a remaining battery capacity as an percentage of a total capacity for the battery and/or a BATTERY_PROPERTY_ENERGY_COUNTER variable to determine an amount remaining energy stored in the battery (e.g., an amount of remaining energy in nanowatt-hours).

In certain implementations, battery sensor 114 may further evaluate other factors that influence the battery power level, such as determining whether the battery power level is increasing (e.g., client device 110 is plugged in an electrical outlet or otherwise recharging the battery). For example, battery sensor 114 may access a Boolean BATTERY_STATUS_CHARGING variable to determine whether the battery is currently being recharged. Battery sensor 114 may further determine whether the batter is discharging (e.g., client device 110 is executing other tasks or applications that are consuming battery power). For example, battery sensor 114 may access a Boolean BATTERY_STATUS_DISCHARGING variable to determine whether the battery is currently discharging and/or a BATTERY_PROPERTY_CURRENT—NOW variable to identify an instantaneous battery current. Battery sensor 114 may further estimate an amount of remaining time that client device 110 may remain active at current discharging rate before depleting the stored battery power.

Server device 120 may include one or more computing devices (e.g., one or more web server devices) capable of accessing document repository 122 or another device (e.g., another server device 120) to obtain information related to a requested document and forwarding this information, as document data 102, to client device 110. For example, server device 120 may forward, as document data 102, data and/or computing code representative of a document to client device 110 via a hypertext transfer protocol (HTTP) or an HTTP-Secure (HTTPS) session. In one implementation, server device 120 may forward document data 102 based on receiving document request 101.

Document repository 122 may include a memory or dynamic storage device that may store information and/or instructions to store document data 102. For example, document repository 122 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Network 130 may include a local area network (LAN), a wide area network (WAN), a metropolitan area network (MAN), a wireless network, an optical fiber (or fiber optic)-based network, a cable television network, an intranet, a satellite television network, the Intranet, and/or a combination of networks. In one implementation, network 130 may include an Internet Protocol (IP)-based network. In some implementations, network 130 may include a private network controlled by, for example, a telecommunications company that provides television, telephone, and/or data access to client device 110. In another implementation, network 130 may be a public network, such as the Internet, or a combination of public and private networks. Network 130 may include a closed distribution network that includes, for example, cable, optical fiber, satellite, or virtual private networks that restrict unauthorized alteration of content delivered by a service provider. For example, the closed distribution network may be implemented by client device 110 or through use of secure/encrypted network communications to client device 110.

Network 130 may also include a network that distributes or makes available services, such as, for example, television services, mobile services, and/or Internet services. Network 130 may be a satellite-based network and/or a terrestrial-based network. In implementations described herein, network 130 may support services for a customer associated with client device 110. Network 130 may include, for example, content storage and distribution devices, customer information devices, billing devices, application devices, content information devices, security/licensing devices, advertising information devices, etc.

Although FIG. 1 shows exemplary components of environment 100, in other implementations, environment 100 may include fewer components, different components, differently arranged components, or additional components than those depicted in FIG. 1. Additionally or alternatively, one or more components of environment 100 may perform functions described as being performed by one or more other components of environment 100.

Figure 2:
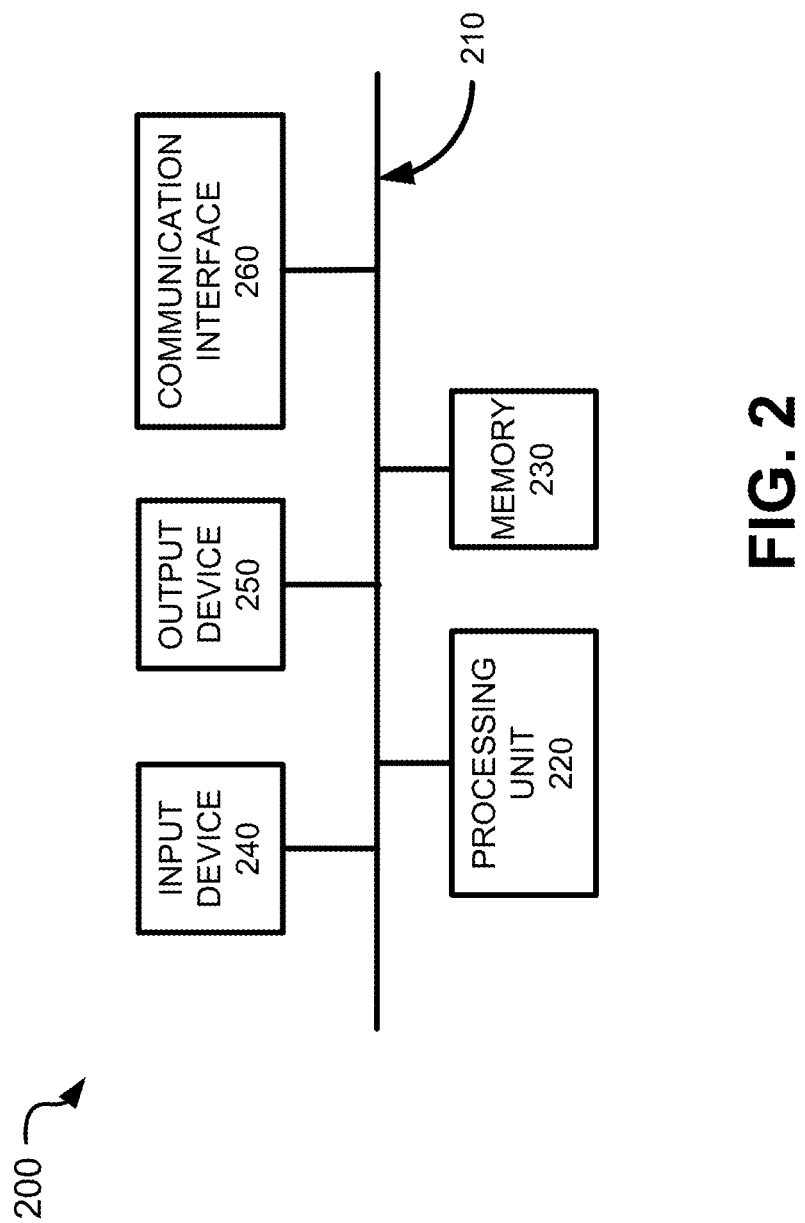
FIG. 2 is a diagram illustrating exemplary components of a device that may be included in the environment of FIG. 1.

FIG. 2 is a diagram illustrating exemplary components of device 200 according to an implementation described herein. Client device 110, server devices 120, document repository 122, and/or components of network 130 may each include one or more devices 200. As shown in FIG. 2, device 200 may include a bus 210, a processing unit 220, a memory 230, an input unit 240, an output unit 250, and a communication interface 260.

Bus 210 may include a path that permits communication among the components of device 200. Processing unit 220 may include any type of single-core processor, multi-core processor, microprocessor, latch-based processor, and/or processing logic (or families of processors, microprocessors, and/or processing logics) that interprets and executes instructions. In other embodiments, processing unit 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processing unit 220, and/or any type of non-volatile storage device that may store information for use by processing unit 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input unit 240 may allow an operator to input information into device 200. Input unit 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input unit 240. In other words, device 200 may be "headless" and may not include a keyboard, for example.

Output unit 250 may output information to an operator of device 200. Output unit 250 may include a display, a printer, a speaker, and/or another type of output device. For example, device 200 may include a display, which may include a liquid-crystal display (LCD) for displaying content to a customer or user. In some embodiments, device 200 may be managed remotely and may not include output unit 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth® wireless interface, a radio-frequency identification (RFID) interface, a near-field communications (NFC) wireless interface, and/or any other type of interface that converts data from one form to another form or transmits/receives data.

Device 200 may perform certain operations in response to processing unit 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processing unit 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than those depicted in FIG. 2. Additionally or alternatively, one or more components of device 200 may perform one or more tasks described as being performed by one or more other components of device 200.

Figure 3:
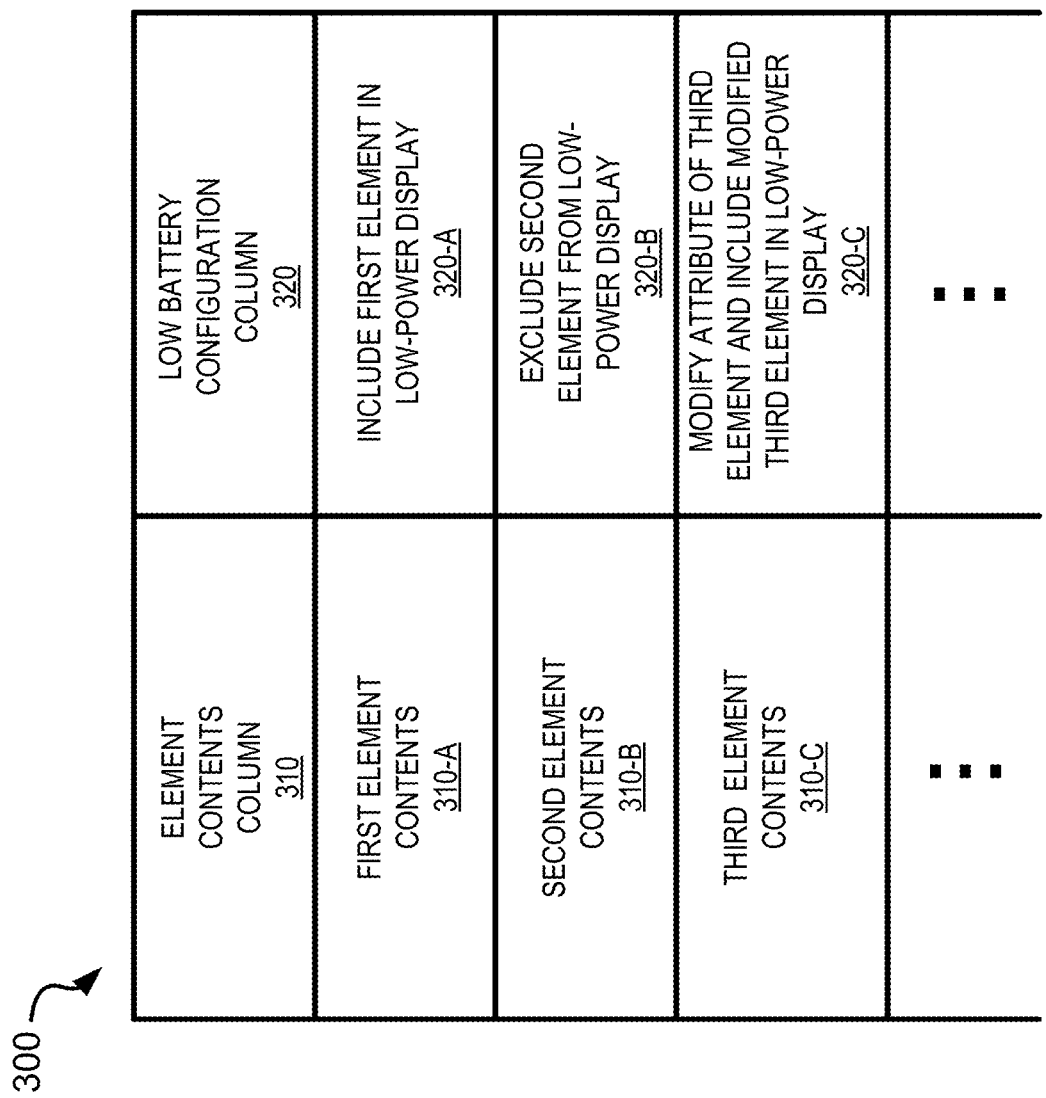
FIG. 3 is a table illustrating exemplary document data that may be collected and stored by a component included in the environment of FIG. 1.

FIG. 3 shows an exemplary table 300 that includes data that may be stored by document repository 122 (e.g., as document data 102) in one implementation. As shown in FIG. 3, table 300 may include, for example, an element contents column 310 and a low battery configuration column 320. In table 300, data included in entries in a row may be associated with a same element 103 (e.g., the contents of low battery configuration column 320-A may be associated with first element contents 310-A).

Element contents column 310 may identify information, such as an alphanumeric character string or other content, included in element 103. If element 103 relates to a file, element contents column 310 may include information identifying contents and/or a storage location associated with the file and may further include information, such as an encoding scheme or an application associated with the file. If element 103 corresponds to code, element contents column 310 may include information identifying a function, data manipulated within the code, and/or the code sections. If element 103 corresponds to a link, element contents column 310 may include information identifying a storage location and/or a description of data accessed via the link.

As shown in FIG. 3, table 300 may further include low battery configuration column 320 that stores data indicating how an associated element 103 should be handled when the battery power associated with client device 110 is below a threshold level. For example, as shown in FIG. 3, low battery configuration column 320 may include information indicating that an associated element 103 should be included in low battery display 105 (entry 320-A); excluded from low battery display 105 (entry 320-B); or an attributed of element 103 should be modified and the modified element 103 should be included in low battery display 105 (entry 320-C). In other examples, low battery configuration column 320 may include entries indicating whether data accessed via a link associated with an element 103 should be collected and included in low battery display 105 and/or whether code associated with an element 103 should be executed when generating and/or presenting low battery display 105.

In operation, if document request 101 indicates that a battery level associated with client device 110 is below a threshold level, server device 120 may collect and forward document data 102 that includes data or modified data from entries in element contents column 310 that are designated by low battery configuration column 320 to be presented in low battery display 105. Alternatively, server device 120 may forward data from both elements content column 310 and low battery configuration column 320 so that client device 320 may selectively apply configuration instructions included in low battery configuration column 320 based on a battery level associated with client device 110. In still another implementation, client device 110 store table 300 or a table similar to table 300 for use in generating low power display 105.

Although FIG. 3 shows exemplary data stored in table 300, in other implementations, table 300 may include fewer, different, differently arranged, or additional columns and rows than those depicted in FIG. 3. Additionally or alternatively, one or more columns and/or rows of table 300 may store data described as being stored by one or more other columns/rows of table 300.

Figure 4:
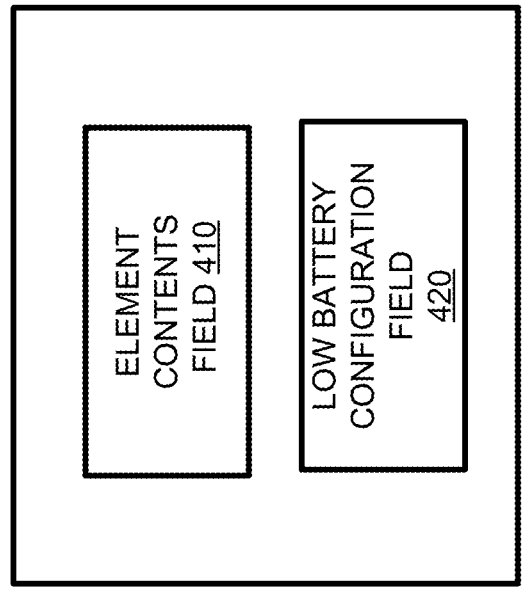
FIG. 4 shows an exemplary interface that may be used to receive the document data shown in FIG. 3.

FIG. 4 shows an exemplary element entry interface 400 that may be presented by server device 120 to an associated user (e.g., a document developer or programmer). As shown in FIG. 4, element entry interface 400 may include an element contents field 410 and a low battery configured field 420. Element contents field 410 may enable the user to input data related to element contents column 310, and low battery configured field 420 may enable a user to input data related to low battery configuration column 320.

For example, one or more of element contents field 410 or low battery configuration field 420 may include a text box that enables the user to manually enter alphanumeric data. For example, element contents field 410 may enable the user to identify content included in a document, such as to input alphanumeric text, specify code (e.g., identify commands and associated data used for the commands), identify a file, identify a storage location, define a link, etc., associated with an element 103.

Additionally or alternatively, one or more of element contents field 410 or low battery configuration field 420 may include a graphical user interface (GUI). For example, element contents field 410 and/or low battery configuration field 420 may include a drop down menu, icons, or other graphical elements that allows the user to select data for element contents field 410 and/or low battery configured field 420 from a list of preset options. With respect to low battery configuration field 420, possible options may include, for example, a first option to include element 103 in low battery display 105; a second option to exclude element 103 from low battery display 105 (entry 320-B); a third option to modify an attribute of element 103 and include the modified element 103 in low battery display 105.

Although FIG. 4 shows exemplary fields included in element entry interface 400, in other implementations, element entry interface 400 may include fewer, different, differently arranged, or additional entry fields than those depicted in FIG. 4. Additionally or alternatively, one or more fields of element entry interface 400 may collect data described as being stored by one or more other fields of element entry interface 400.

Figure 5:
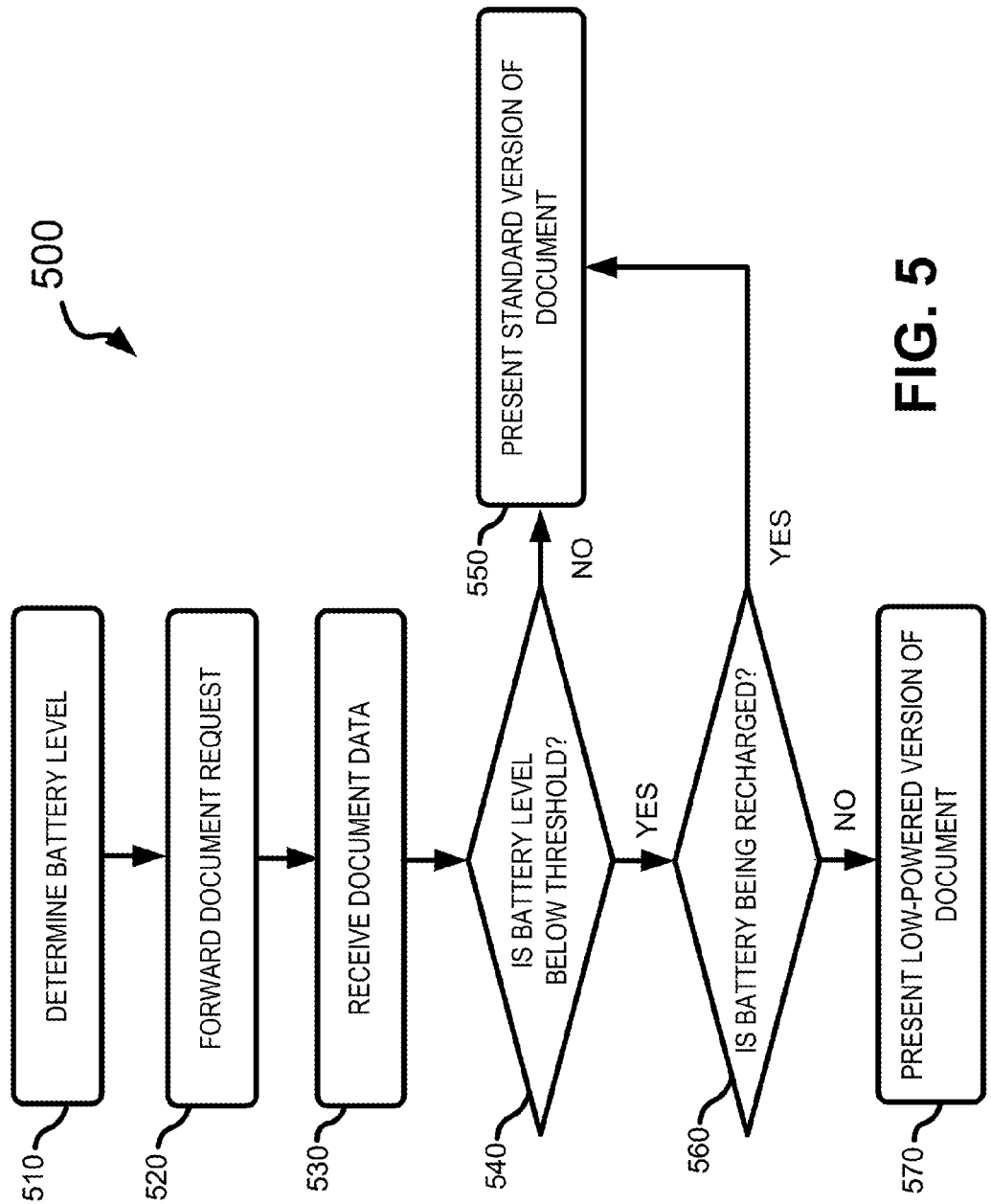

FIG. 5 is a flowchart of a process 500 for selectively presenting standard display 104 or low battery display 105 based on a battery level associated with client device 110 according to an implementation described herein. In some implementations, process 500 may be performed by client device 110. In other implementations, some or all of process 500 may be performed by another device or a group of devices separate from and/or including client device 110.

As shown in FIG. 5, process 500 may include determining a battery level (block 510) and forwarding document request 101 (block 520). In process block 510, battery sensor 114 may determine a battery level associated with client device 110. For example, battery sensor 114 may perform a script included in another document (e.g., the other document includes a link for document data 102) and selection of the link may cause battery sensor 114 to determine a battery level associated with client device 110. In process 520, document request 101 may include data identifying a desired document and/or contents. For example, if document request 101 is triggered by a user selection of a link, the link may include a document identifier, a storage location, data identifying server device 120 and/or document repository 122, etc. In one implementation, document request 101 may include data indicating a battery level associated with client device 110. If document request 101 corresponds to a URL, client device 110 may modify the URL to include information identifying the battery level. For example, the URL may include an extension or include information in a header identifying the battery level of client device 110. In another example, the URL may include an Boolean-type (e.g., indicating a "true" or "false") extension identifying whether the battery level of client device 110 satisfies a threshold level.

Continuing with FIG. 5, process 500 may include receiving document data 102 from server device 120 (block 530) and determining whether the battery levels is below a threshold level (block 540). For example, document data 102 may include information identifying, as the threshold level, an amount of power needed to perform a task (e.g., provide standard display 104 and performing related tasks), and display controller 112 may determine whether the battery level identified in process block 510 satisfies the threshold level. Alternatively, client device 110 may determine whether the battery level is above capacity level (e.g., 10%, 20%, etc.) of the total capacity of the battery.

As further shown in FIG. 5, process 500 may further include presenting standard display 104 (block 550) if the battery levels is not below the threshold level (block 540-No). For example, display controller 112 may present multiple elements 103 from the requested document in an original form. If the battery levels is below the threshold level (block 540-Yes), display controller 112 may determine whether the battery in client device 110 is being recharged (block 560). For example, battery sensor 114 may execute a script to determine if a battery level associated with client device 110 is increasing and/or if client device 110 is plugged into a power source.

If the battery is being recharged (block 560-Yes), client device 110 may present standard display 104 in process block 550. Otherwise, if the battery level is below the threshold level (block 540-Yes) and the battery is not being recharged (block 560-No), display controller 112 may present low battery display 105 (block 570). For example, display controller 112 may modify standard display 104 by removing certain elements 103 and/or modifying attributes associated with other elements 103 (e.g., change a color, brightness, intensity, size, or other attribute associated with a graphical element 103) and may present, as low battery display 105, the modified version of standard display 104.

FIG. 6 is a flowchart of a process 600 for selectively providing different sets of document data 102 based on a battery level associated with client device 110 according to an implementation described herein. In some implementations, process 600 may be performed by server device 120. In other implementations, some or all of process 600 may be performed by another device or a group of devices separate from and/or including server device 120.

Process 600 may include receiving document request 101 (block 610). For example, document request 101 may correspond to a HTTP or a HTTPS request from client device 110 for a document. Server device 120 may parse document request 101 to identify a requested document.

As shown in FIG. 6, server device 120 may identify a battery level associated with client device 110 (block 620). For example, server device 120 may parse document request 101 to extract information (e.g., a URL extension) identifying the battery level associated with client device 110. In another example, server device 120 may exchange one or more messages, with client device 110, to request battery level information. For example, server device 120 may forward information to client device 110 identifying a threshold battery level, and client device 110 may send a reply message indicting whether its battery levels satisfies the threshold battery level. In yet another example, server device 120 may infer the battery level based on other factors, such as a signal strength (e.g., amplitude) or other transmission characteristic (e.g., wavelength, phase, etc.) associated with document request 101 or another message received from client device 110.

Continuing with process 600 in FIG. 6, server device 120 may provide a version of document data 102 associated with the battery level for client device 110 (block 630). For example, server device 120 may provide document data 102 associated with elements 103 of standard display 104 when the battery level satisfies a threshold, and may provide different document data 102 associated with different/modified elements 103 of low battery display 105 when the battery level does not satisfy the threshold. In one implementation, server device 120 may include, in second document data 102, configuration instructions (e.g., identifying a layout, particular elements 103, a format of an elements 103, etc.) associated with low battery display 105.

FIG. 7 is a flowchart of a process 700 for determining a threshold battery level according to an implementation described herein. In some implementations, process 700 may be performed by client device 110. In other implementations, some or all of process 700 may be performed by another device or a group of devices separate from and/or including client device 110.

As shown in FIG. 7, process 700 may include identifying attributes associated with elements 103 included in standard display 104 (block 710). For example, client device 110 may parse document data 102 to identify elements 103, and client device 110 may process elements 103 to identify associated attributes. For example, if an element 103 corresponds to a graphical image, client device 110 may identify a size, color, brightness, intensity, etc., associated with the graphical image. If document data 102 include a CSS, client device 110 may parse the CSS to identify attributes associated with the document. If element 103 corresponds to a file or a link to the file, client device 110 may determine a type and a size of the file and may further identify any processing needed to access contents of the file. If element 103 includes script or other types of commands, client device 110 may determine a number of operations used to execute the script.

As shown in FIG. 7, process 700 may further include determining, based on the attributes, power needed by client device 110 to present the elements 103 (block 720). For example, client device 110 may monitor presentations of other elements 103 and may identify attributes associated with the other elements and based on the amounts of power used to present the elements 103. Client device 110 may estimate an amount of power used to display an element 103 based on the amount of power needed to present another element 103 having similar attributes. Client device 110 may further determine an aggregate amount of power needed to present standard display 104 based on elements 103 included in standard display 104.

As shown in FIG. 7, process 700 may further include determining how much power being used by client device 110 for other tasks (block 730). For example, client device 110 may identify tasks currently being performed by client 110 and may estimate an amount of power needed for these tasks. In another example, client device 110 may execute a script to identify an amount of current/power being drained from the battery during a time period prior to presentation of elements 103.

Continuing with process 700 in FIG. 7, client device 110 may determine, as a threshold value, a battery level needed to present elements 103 included in standard display 104 (block 740). For example, client device 110 may identify a sum of the amount of power needed to present elements 103 (as determined in process block 720) and an amount of power being used by client device 110 for other tasks (as determined in block 730). Client device 110 may further modify the sum to include an additional amount to be used buffer. Client device 110 may then identify, as the threshold value, a portion of the total battery power that corresponds to the modified sum. As previously described, if the battery has the threshold level of charge/power, client device 110 may display elements 103 included in standard display 104.

FIGS. 8A and 8B show exemplary original display 800-A and modified display 800-B that may correspond, respectively to standard display 104 and low power display 105. As shown in FIGS. 8A and 8B, original display 800-A may include a background image 810 and/or one or more graphical features 820 that are excluded from modified display 800-B. As further shown in FIGS. 8A and 8B, a color, shade, and/or brightness associated with a region 830-A may be changed within a corresponding region 830-B of modified display 800-B. As still further shown in FIGS. 8A and 8B, a color, shade, and/or brightness of text 840-A within region 830-A may be changed for text 840-B within the corresponding region 830-B of modified display 800-B so that text 840-B is visible to a user. Similarly, size of text 850-A within original display 800-A may be increased for text 850-B within modified display 800-B to fill space caused by removing graphical feature 820.

Although FIGS. 8A and 8B show exemplary items includes in original display 800-A and modified display 800-B, in other implementations, original display 800-A and modified display 800-B may include fewer, different, differently arranged, or additional items than those depicted in FIGS. 8A and 8B.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of blocks have been described with respect to processes 500, 600, and 700 in FIGS. 5-7 the order of the blocks and/or signals may be modified in other implementations. Further, non-dependent blocks and/or signals may be performed in parallel.

For example, in one implementation, client device 110 may take into consideration a time of day and/or external conditions (e.g., ambient lighting and/or sound levels) when determining elements 103 include/modify in low power display 105 (e.g., to present an element 103 with more brightness during the daytime when more ambient is present and dimmer during the evening). In another implementation, client device may initially present standard display 104 for a certain amount of time and then switch to low battery display 105 based on a detected battery level, and the amount of time that standard display 104 is presented may vary based on the battery level. In yet another implementation, different low battery displays 105 may be generated and/or presented based on the detected battery levels. For example, a first low battery display 105 with fewer elements 103 may be presented when the battery level is between first and second threshold levels (e.g., between 20% and 30%) and a second low battery display 105 with even fewer elements 103 may be displayed when the battery level is below both first and second threshold levels (e.g., below 20%). In still another implementation, a database of certain key terms (e.g., "order," "help," "support," etc.) may be stored, and low battery display 105 may be generated by removing an element 103 from standard display 104 if the element 103 does not includes and/or is not associated with one of the key terms (e.g., does not present a graphical representation of a key term).

In another example, the low battery threshold may be a variable, and may vary based on the type of content associated with standard display 104. For example, if standard display 104 relates to an emergency notice, standard display 104 could be displayed unless the battery level is below a first, relatively low threshold battery level (e.g., 10% of full charge), whereas if standard display 104 relates to a different topic, such as a commercial advertisement, low battery display 105 may be presented if the battery level is below a second, higher threshold battery level (e.g., 30% of full charge). For example, metadata that accompanies or is otherwise associated with a file, content, or a stream associated with an element 103 may be used to determine a relative important the content within standard display 104, and thus how low the battery level must be to cause user device 110 to present low battery display 105. In another example, the second, higher threshold battery level may be used when standard display 104 is associated with a multimedia content such as video content or audio (e.g., if standard display 104 activates a music player to play music), whereas the first, lower threshold battery level may be used when standard display 104 is associated with a webpage or a text-based document.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code, it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
receiving, by a processor associated with a client device, data that includes information associated with a first element in a document;
determining, by the processor, a battery level associated with the client device;
determining, by the processor, whether the battery level satisfies a threshold;
presenting, by the processor and when the battery level satisfies the threshold, the document for display on a display of the client device, wherein presenting the document includes presenting the first element; and
presenting, by the processor and when the battery level does not satisfy the threshold, a modified document for display on the display, wherein the modified document includes a modified version of the first element that is formed using a table that stores data indicating how to modify elements to form modified versions of the elements, and wherein the client device uses less power to present the modified document than the document.

2. The method of claim 1, wherein the first element is associated with an image, and wherein the modified version of the first element is formed by changing at least one of a color, a shape, a size, a brightness, or a displayed position associated with the image.

3. The method of claim 1, wherein the first element is associated with dynamic content, and wherein the modified version of the first element is associated with a static version of the dynamic content.

4. The method of claim 1, wherein the data further includes information associated with a second element in the document, and wherein the modified version omits the second element.

5. The method of claim 1, wherein the data further includes instructions for generating the modified version of the first element.

6. The method of claim 1, further comprising:
generating a request for the document, wherein the request includes an indication of the battery level; and
forwarding the request to another device, wherein the data is received from the other device.

7. The method of claim 1, further comprising:
identifying an attribute associated with the first element;
estimating, based on the attribute, a first amount of power to be used by the client device to present the first element for display; and
calculating the threshold based on the first amount of power.

8. The method of claim 7, further comprising:
identifying a second amount of power being used by the client device before presenting the document or the modified document, wherein the threshold is further calculated based on a sum of the first amount of power and the second amount of power.

9. A device comprising:
a display;
a battery;
a battery sensor configured to identify a battery level associated with the battery; and
a processor configured to:
receive data that includes information associated with a first element in a document;
determine whether the battery level satisfies a threshold;
present, when the battery level satisfies the threshold, the document on the display, wherein presenting the document includes presenting the first element; and
present, when the battery level does not satisfy the threshold, a modified document for display on the display, wherein the modified document includes a modified version of the first element formed based on a table that stores data indicating how to modify elements to form modified version of the elements, and wherein the presenting the modified document uses less power than presenting the document.

10. The device of claim 9, wherein the first element is associated with an image, and wherein the modified version of the first element is formed by changing at least one of a color, a shape, a size, a brightness, or an intensity associated with the image.

11. The device of claim 9, wherein the first element is associated with dynamic content, and wherein the modified version of the first element is associated with a static version of the dynamic content.

12. The device of claim 9, wherein the data further includes information associated with a second element in the document, and wherein the modified version does not include the second element.

13. The device of claim 9, wherein the processor is further configured to:
determine whether the battery is being recharged when the data is received, wherein the modified document is presented for display based on determining that the battery is not being recharged.

14. The device of claim 9, wherein the processor is further configured to:
generate a request for the document, wherein the request includes an indication of the battery level; and
forward the request to another device, wherein the data is received from the other device.

15. The device of claim 9, wherein the processor is further configured to:
identify an attribute associated with the first element;
estimate, based on the attribute, a first amount of power to be used by the device when presenting the first element for display; and
determine the threshold based on the first amount of power.

16. The device of claim 15, wherein the processor is further configured to:
identify a second amount of power being used by the device before presenting the document or the modified document, wherein processor further determines the threshold based on a sum of the first amount of power and the second amount of power.

17. A non-transitory computer-readable medium configured to store instructions, the instructions comprising:
one or more instructions that, when executed by a processor associated with a device, cause the processor to:
identify a battery level of a battery associated with the device;
receive data that includes information associated with a first element in a document;
determine whether the battery level satisfies a threshold;
present, when the battery level satisfies the threshold, the document for display on a display of the device, wherein presenting the document include presenting the first element; and
present, when the battery level does not satisfy the threshold, a modified document for display on the display, wherein the modified document includes a modified version of the first element formed based on a table that stores data indicating how to modify elements to form modified version of the elements, and wherein the presenting the modified document uses less power than presenting the document.

18. The non-transitory computer-readable medium of claim 17, wherein the first element is associated with an image, and wherein the modified version of the first element is formed by changing at least one of a color, a shape, a size, a brightness, or an intensity associated with the image.

19. The non-transitory computer-readable medium of claim 17, wherein the data further includes information associated with a second element in the document, and wherein the modified version excludes the second element.

20. The non-transitory computer-readable medium of claim 17, wherein the one or more instructions, when executed by the processor, further cause the processor to:
identify an attribute associated with the first element;
estimate, based on the attribute, an amount of power to be used by the device when presenting the first element for display; and
determine the threshold based on the amount of power.

* * * * *